US009236910B2

(12) United States Patent
Eguchi

(10) Patent No.: US 9,236,910 B2
(45) Date of Patent: Jan. 12, 2016

(54) IN-VEHICLE POWER LINE COMMUNICATION SYSTEM

(75) Inventor: Tsuyoshi Eguchi, Utsunomiya-shi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 13/312,256

(22) Filed: Dec. 6, 2011

(65) Prior Publication Data

US 2012/0146776 A1    Jun. 14, 2012

(30) Foreign Application Priority Data

Dec. 14, 2010    (JP) .................................. 2010-278538

(51) Int. Cl.
*G05B 11/01* (2006.01)
*H04B 3/54* (2006.01)

(52) U.S. Cl.
CPC .......... *H04B 3/548* (2013.01); *H04B 2203/547* (2013.01)

(58) Field of Classification Search
CPC .......................... H04B 3/548; H04B 2203/547
USPC .............. 340/3.21, 3.51, 3.55, 3.6, 3.61, 458; 713/300

See application file for complete search history.

(56) References Cited

U.S. PATENT DOCUMENTS 4,907,222 A  *  3/1990  Slavik ........................... 370/443
5,592,485 A  *  1/1997  Consiglieri et al. ............ 340/2.1
5,793,946 A  *  8/1998  Gauthier et al. ................. 714/25
5,969,583 A  *  10/1999  Hutchison ...................... 333/181
6,425,030 B1 *  7/2002  Melcher ......................... 710/110

(Continued)

FOREIGN PATENT DOCUMENTS

JP    07-284177    10/1995
JP    2003-032159    1/2003

(Continued)

OTHER PUBLICATIONS

Yamar Electronic Ltd QDC10—Multiplex Data on Battery Power Lines Data sheet Jan. 2002 DS-QDC10 R1.5.*

(Continued)

*Primary Examiner* — Amine Benlagsir
*Assistant Examiner* — Royit Yu
(74) *Attorney, Agent, or Firm* — Rankin, Hill & Clark LLP

(57) ABSTRACT

In an in-vehicle power line communication system in which a power line communication network and a battery are connected to each other via a first power line, the power line communication network includes a master power line communication node connected to the battery via the first power line, a second power line, slave power line communication nodes including at least a transmitting slave power line communication node and a receiving slave power line communication node, a transmitting-side in-vehicle device, and a receiving-side in-vehicle device. The master power line communication node and the slave power line communication nodes communicate with each other using a time-triggered communication protocol. The mutual communicating of the slave power line communication nodes are controlled by a token signal output from the master power line communication node. Only the master power line communication node and the slave power line communication nodes are connected to the second power line.

5 Claims, 2 Drawing Sheets

(56) References Cited

U.S. PATENT DOCUMENTS

| | | |
|---|---|---|
| 2003/0128111 A1* | 7/2003 | Sano et al. .................. 340/459 |
| 2003/0201873 A1* | 10/2003 | Cern ....................... 340/310.07 |
| 2004/0070912 A1* | 4/2004 | Kopp ......................... 361/119 |
| 2004/0223275 A1* | 11/2004 | Yanagida et al. ............... 361/62 |
| 2005/0104577 A1* | 5/2005 | Matei et al. ............. 324/207.13 |
| 2006/0038445 A1* | 2/2006 | Yanagida et al. ................ 307/1 |
| 2006/0061329 A1* | 3/2006 | Dawson ...................... 320/115 |
| 2006/0159388 A1* | 7/2006 | Kawase et al. ................. 385/16 |
| 2007/0286225 A1 | 12/2007 | Enders et al. |
| 2008/0170418 A1* | 7/2008 | Nishiyama et al. ............. 363/17 |
| 2008/0252429 A1* | 10/2008 | Yanagida et al. ......... 340/310.11 |
| 2008/0272894 A1 | 11/2008 | Lamon et al. |
| 2008/0303343 A1* | 12/2008 | Yamashita et al. ............... 307/3 |
| 2008/0316012 A1* | 12/2008 | Paasche et al. ............... 340/458 |
| 2009/0323829 A1* | 12/2009 | Riveiro et al. ................ 375/257 |
| 2010/0011228 A1* | 1/2010 | Chen et al. ................... 713/300 |
| 2010/0039494 A1* | 2/2010 | Horihata et al. ........... 348/14.02 |
| 2011/0064126 A1* | 3/2011 | Ishiko .......................... 375/222 |
| 2011/0134976 A1* | 6/2011 | Fossion et al. ................ 375/222 |

FOREIGN PATENT DOCUMENTS

| | | |
|---|---|---|
| JP | 2004-312897 | 11/2004 |
| JP | 2008-141455 | 6/2008 |
| JP | 4331777 | 6/2009 |

OTHER PUBLICATIONS

Yamar Electronic Ltd ISL40—Independent DC-LIN Slave for Asynchronous Communication Over Noisey Lines Data sheet 2007 DS-ISL40 R1.6.*

JP Notice of Allowance, Application No. 2010-278538, Mailed Nov. 27, 2012, with English Translation, Six Pages.

* cited by examiner

IN-VEHICLE POWER LINE COMMUNICATION SYSTEM

BACKGROUND OF THE INVENTION

1. Field of the Invention

The present invention relates to an in-vehicle power line communication system.

Priority is claimed on Japanese Patent Application No. 2010-278538, filed Dec. 14, 2010, the content of which is incorporated herein by reference.

2. Description of Related Art

For example, an in-vehicle communication system was known in the past, in which plural in-vehicle components are connected to each other through the use of a data bus structure capable of only transmitting information and a supply line structure capable of supplying power and transmitting information, information with low importance is transmitted through the use of only the data bus structure, and information with high importance is redundantly transmitted through the use of the data bus structure and the supply line structure (for example, see Japanese Patent No. 4331777).

SUMMARY OF THE INVENTION

However, in the in-vehicle communication system according to the above-mentioned related art, since two transmission structures of the data bus structure and the supply line structure are necessary for information transmission between the in-vehicle components, there is a problem in that the cost of system construction increases, the system weight increases, and the vehicle-mounting ability decreases.

Moreover, by only connecting plural in-vehicle components through the use of the supply line structure in a vehicle, it is not possible to prevent noise generated from various in-vehicle components from being superimposed on information to be transmitted through the use of the supply line structure. There is also a problem in that the absorption or attenuation of signals to be transmitted through the supply line structure by various in-vehicle components is not suppressed and it is thus difficult to appropriately transmit information.

For example, when a special modulation method for improving noise resistance is used to transmit information through the supply line structure for the purpose of solving these problems, there is a problem in that cost of system construction further increases and the processing load increases.

An advantage of some aspects of the invention is that it provides an in-vehicle power line communication system capable of appropriately communicating with a reduced cost of system construction and with a reduced weight of system.

The following configurations are employed to achieve the above-mentioned advantage.

(1) According to an aspect of the invention, there is provided An in-vehicle power line communication system in which a power line communication network and a battery mounted on a vehicle are connected to each other via a first power line, wherein the power line communication network includes: a master power line communication node that is connected to the battery via the first power line and that is supplied with power from the battery; a second power line; a plurality of slave power line communication nodes having at least a transmitting slave power line communication node and a receiving slave power line communication node that are connected to the master power line communication node via the second power line, that are supplied with the power from the battery via the master power line communication node, and that are connected to each other via the second power line so as to be able to perform multiplex communication with each other; a transmitting-side in-vehicle device that is connected to the transmitting slave power line communication node, that can operate in response to an operator's operation, and that outputs an operation signal, which indicates the operator's operation was made, to the second power line from the transmitting slave power line communication node by the multiplex communication; and a receiving-side in-vehicle device that is connected to the receiving slave power line communication node and that can operate when receiving the operation signal output from the transmitting slave power line communication node, wherein the master power line communication node and the plurality of slave power line communication nodes communicate with each other in accordance with a time-triggered communication protocol which performs periodically data communication, wherein mutual transmitting and receiving operations of the plurality of slave power line communication nodes are controlled by a token signal output from the master power line communication node, and wherein only the master power line communication node and the plurality of slave power line communication nodes are connected to the second power line.

(2) The in-vehicle power line communication system according to (1) may further include a choke coil (for example, a choke coil 14 in an embodiment) installed in the first power line.

In the in-vehicle power line communication system according to the aspect of (1) of the invention, since communication can be performed in the power line communication network through the use of only the first power line and the second power line, no special communication line is necessary, cost of system construction can be reduced, and the decrease in weight of the system can be achieved.

Only the master power line communication node and the plural slave power line communication nodes are connected to the second power line and other devices controlled by control signals output from control units other than the master power line communication node are not connected to the second power line.

Accordingly, it is possible to easily prevent, for example, noise generated from electronic elements of the other devices from being superimposed on a signal to be transmitted via the second power line. No special modulation method for improving noise resistance or the like is necessary, and it is possible to reduce the cost of system construction and to prevent an increase in processing load.

For example, it is possible to prevent a signal transmitted via the second power line from being absorbed or attenuated by another device.

Since the master power line communication node and the plural slave power line communication nodes communicate with each other in accordance with the time-triggered communication protocol, the same signal is periodically transmitted via the second power line. Accordingly, for example, even when the communication nodes hardly receive a proper signal at an appropriate time due to noise or the like, the proper signal can be received at a subsequent time, thereby guaranteeing the desired stability of communication via the second power line.

Even when the reception of a signal is delayed in this way, the communication via the second power line is performed by the operator's operation on the transmitting-side in-vehicle device and is thus limited to communication for device operations (for example, unlocking of a vehicle door or opening or closing of a vehicle window) permitting an appropriate time delay of an extent that does not impose an unpleasant feeling on the operator or is not sensed by the operator.

That is, device operations (for example, operation control of an engine) hardly permitting the delay of signal reception do not depend on the operator's operation but are autonomously controlled without any time delay. The communication for such device operations is not set as the communication via the second power line.

Accordingly, it is possible to reduce the cost of system construction without damaging marketability.

In the in-vehicle power line communication system according to (2), by including the choke coil upstream from the power line communication network, that is, between the power line communication network and the battery, it is possible to prevent noise generated from the battery from being superimposed on a signal transmitted via the second power line and to prevent a signal transmitted via the second power line from being absorbed or attenuated by the battery.

DETAILED DESCRIPTION OF THE INVENTION

Hereinafter, an in-vehicle power line communication system according to an embodiment of the invention will be described with reference to the accompanying drawings.

Figure 1:
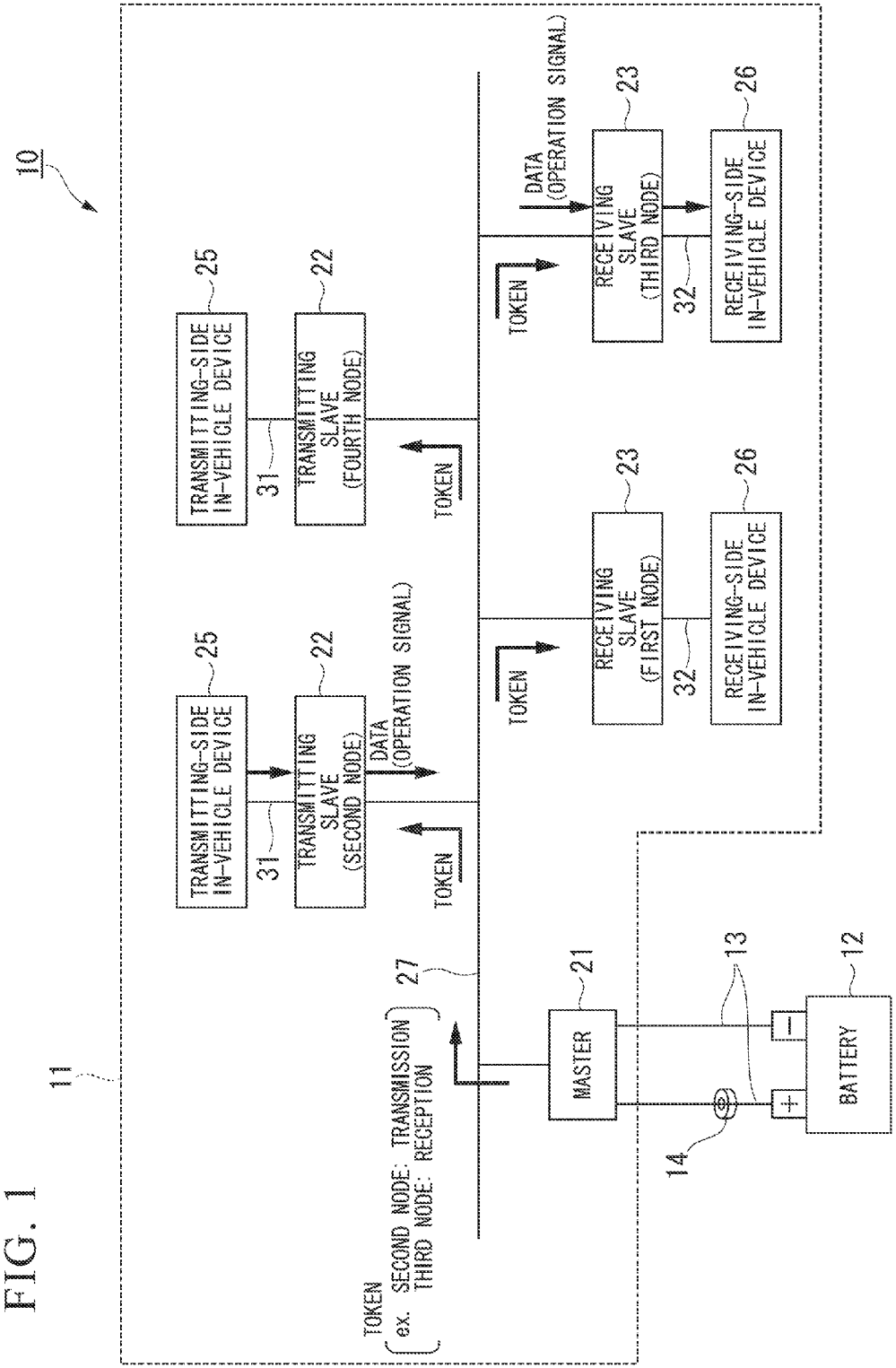
FIG. 1 is a diagram illustrating the configuration of an in-vehicle power line communication system according to an embodiment of the invention.

In the in-vehicle power line communication system 10 according to this embodiment, for example, as shown in FIG. 1, a power line communication network 11 and a battery 12 mounted on a vehicle are connected to each other via a first power line 13 and a choke coil 14 is installed in the first power line 13.

The power line communication network 11 includes, for example, a master power line communication node 21, plural (for example, two) transmitting slave power line communication nodes 22, plural (for example, two) receiving slave power line communication nodes 23, plural (for example, two) transmitting-side in-vehicle devices 25, plural (for example, two) receiving-side in-vehicle devices 26, and a second power line 27 connecting the communication nodes 21, 22, and 23.

The master power line communication node 21 is connected to the battery 12 via the first power line 13 and is supplied with power from the battery 12 via the first power line 13.

The master power line communication node 21 outputs a token signal for controlling the mutual transmitting and receiving operations of the plural transmitting slave power line communication nodes 22 and the plural receiving slave power line communication nodes 23 in accordance with a time-triggered communication protocol of periodically performing data communication to the second power line 27.

The token signal is a signal indicating a data transmission schedule of the plural transmitting slave power line communication nodes 22 and a data reception schedule of the plural receiving slave power line communication nodes 23.

For example, the token signal instructs the performance of periodically data transmission at different predetermined times depending on the plural transmitting slave power line communication nodes 22 and instructs the performance of periodically data reception at different predetermined times depending on the plural receiving slave power line communication nodes 23.

The master power line communication node 21 multiplexes a signal of power supplied from the battery 12 via the first power line 13 and the token signal and outputs the multiplexed signals to the second power line 27.

Accordingly, the respective transmitting slave power line communication nodes 22 and the respective receiving slave power line communication nodes 23 transmit the signal of power and the token signal in the multiplexed state.

The master power line communication node 21 may be connected to another communication line such as a CAN (Controller Area Network) communication line of a vehicle and a LIN (Local Interconnect Network) communication line other than the power line communication network 11 and may also serve as a gateway of the communication line.

The plural transmitting slave power line communication nodes 22 and the plural receiving slave power line communication nodes 23 are connected to each other via the second power line 27 so as to be able to perform multiplex communication with each other and are supplied with power through the use of the signal of power output from the master power line communication node 21.

The mutual transmitting and receiving operations of the plural transmitting slave power line communication nodes 22 and the plural receiving slave power line communication nodes 23 are controlled by the token signal output from the master power line communication node 21.

The transmitting slave power line communication nodes 22 periodically perform data transmission at predetermined unique times instructed by the token signal, and the receiving slave power line communication nodes 23 periodically perform data reception at predetermined unique times instructed by the token signal.

For example, as shown in FIG. 1, when the data transmission of a transmission slave power line communication node 22 as a second node and the data reception of a receiving slave power line communication node 23 as a third node are instructed by the token signal output from the master power line communication node 21 at a proper time, the data transmission of another transmitting slave power line communication node 22 (for example, a fourth node) and the data reception of another receiving slave power line communication node 23 (for example, a first node) are not performed.

Accordingly, data output from the transmitting slave power line communication node 22 as the second node can be received by only the receiving slave power line communication node 23 as the third node.

In the time-triggered communication protocol, the token signals having the same instruction details are output from the master power line communication node 21 periodically at a predetermined time.

Accordingly, even when there is a time that the receiving slave power line communication node 23 instructed to perform the data reception cannot appropriately receive the data output from the transmitting slave power line communication node 22 instructed to perform the data transmission due to noise or the like, it can appropriately receive the data at a periodic predetermined time subsequent thereto.

The transmitting-side in-vehicle device 25 is constructed, for example, by a switch operating in response to an operator's operation or the like. The transmitting-side in-vehicle device 25 is connected to the transmitting slave power line communication node 22, for example, via a communication line 31 and outputs an operation signal indicating the operator's operation to the second power line 27 through the use of the transmitting slave power line communication node 22 by the multiplex communication.

The communication line 31 is used to transmit a signal corresponding to an operator's predetermined operation on the transmitting-side in-vehicle device 25 to the transmitting slave power line communication node 22 from the transmitting-side in-vehicle device 25.

The receiving-side in-vehicle device 26 is constructed, for example, by an actuator of which the driving is controlled in accordance with the operation signal output from the transmitting slave power line communication node 22, a switch instructing the driving control of the actuator in response to an operator's operation, or the like. Also the receiving-side in-vehicle device 26 is connected to the receiving slave power line communication node 23, for example, via a power line 32, and can operate in response to an operation signal when the operation signal output from the transmitting slave power line communication node 22 is received by the receiving slave power line communication node 23.

The power line 32 supplies the receiving-side in-vehicle device 26 with only the signal of power output from the master power line communication node 21 out of the multiplexed signals received by the receiving slave power line communication node 23 at a predetermined time corresponding to the operation signal received by the receiving slave power line communication node 23.

Other devices which are controlled by control signals output from control units other than the master power line communication node 21 are not connected to the second power line 27, and the power line communication network 11 constitutes a closed system which is controlled by only the master power line communication node 21.

The transmitting-side in-vehicle device 25 and the receiving-side in-vehicle device 26 may be incorporated into a body to serve as a transmitting-receiving slave power line communication node having functions of both transmission and reception.

Figure 2:
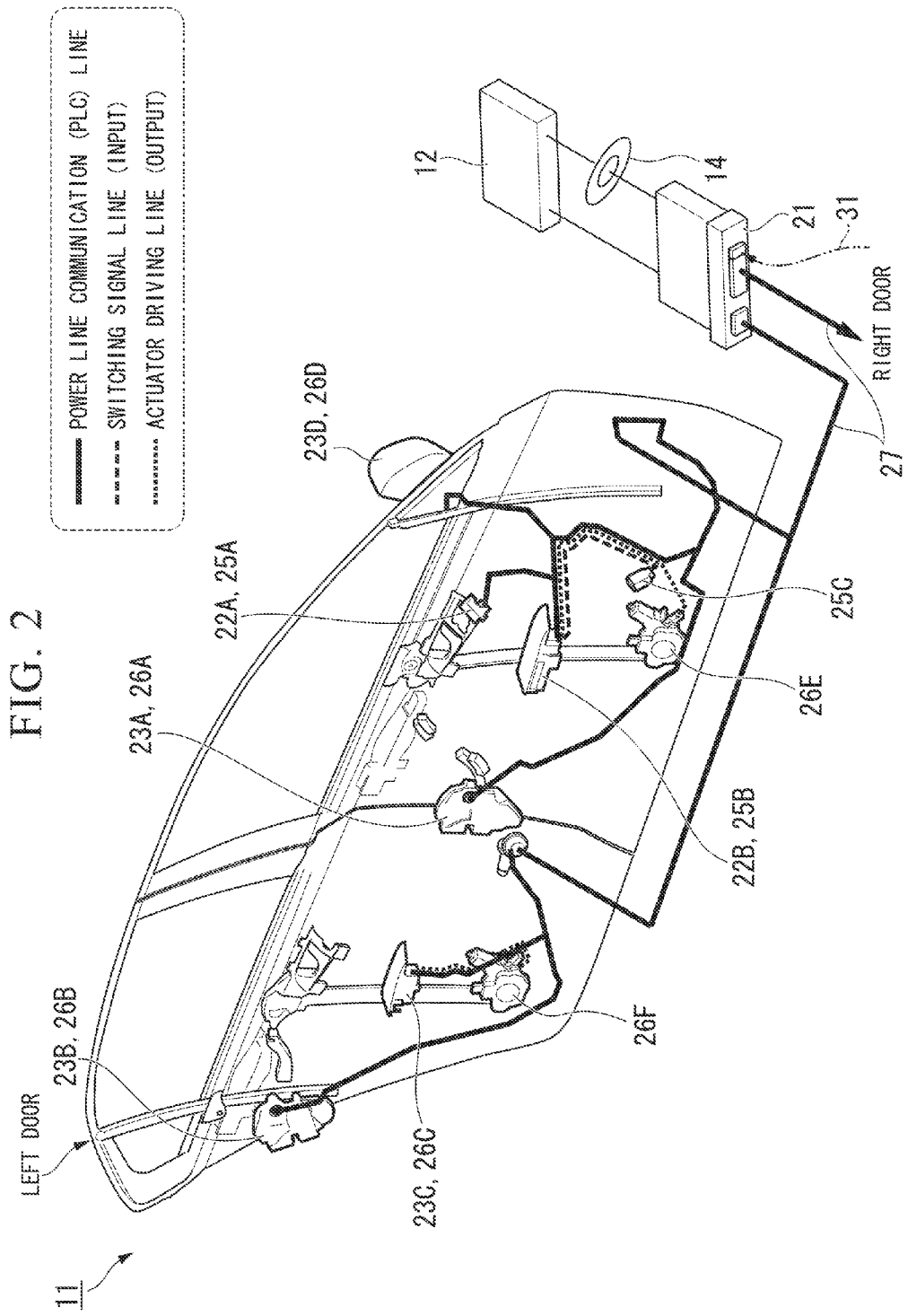
FIG. 2 is a diagram illustrating the configuration of the in-vehicle power line communication system according to the embodiment of the invention.

For example, FIG. 2 shows an example of the power line communication network 11 constituting a closed system installed in a vehicle door (for example, a left door).

In the power line communication network 11, for example, the transmitting slave power line communication node 22 connected to a power line communication (PLC) line as the second power line 27 includes a transmitting slave power line communication node 22A having a door lock switch 25A as the transmitting-side in-vehicle device 25 and a transmitting slave power line communication node 22B having a driver-side window switch 25B as the transmitting-side in-vehicle device 25.

For example, the receiving slave power line communication node 23 connected to a power line communication (PLC) line as the second power line 27 includes a receiving slave power line communication node 23B having a rear-seat side door lock actuator 26B as the receiving-side in-vehicle device 26, a receiving slave power line communication node 23C having a rear-seat side window switch 26C as the receiving-side in-vehicle device 26, and a receiving slave power line communication node 23D having a door mirror actuator 26D as the receiving-side in-vehicle device 26.

In addition, a transmitting-receiving slave power line communication node 23A having a driver-seat side door lock actuator 26A as the receiving-side in-vehicle device 26 is connected as the transmitting-receiving slave power line communication node, in which a transmitting-side in-vehicle device 25 and a receiving-side in-vehicle device 26 are incorporated into a body and which has both functions of transmission and reception, to the power line communication (PLC) line as the second power line 27.

A trunk open switch 25C as the transmitting-side in-vehicle device 25 is connected to the transmitting slave power line communication node 22B having the driver-seat side window switch 25B as the transmitting-side in-vehicle device 25 via a switch signal line (input) as the communication line 31.

A power window motor 26E as the receiving-side in-vehicle device 26 is connected to the transmitting slave power line communication node 22B having the driver-seat side window switch 25B as the transmitting-side in-vehicle device 25 via an actuator driving line (output) as the power line 32.

A power window motor 26F as the receiving-side in-vehicle device 26 is connected to the receiving slave power line communication node 23C having the rear-seat side window switch 26C as the receiving-side in-vehicle device 26 via an actuator driving line (output) as the power line 32.

The master power line communication node 21 is connected to a radio communication unit that can radio-communicate with a mobile device (not shown) via an in-vehicle LAN (Local Area Network) communication line 31 such as a CAN communication line or a LIN communication line.

Other devices which are controlled by control signals output from control units other than the master power line communication node 21 are not connected to the second power line 27, and the power line communication network 11 constitutes a closed system which is controlled by only the master power line communication node 21.

In the power line communication network 11, when the door lock switch 25A is made to operate by an operator, an operation signal is output to the second power line 27 from the transmitting slave power line communication node 22A, and the driver-seat side door lock actuator 26A and the rear-seat side door lock actuator 26B are driven by the transmitting-receiving slave power line communication node 23A and the receiving slave power line communication node 23B which received the operation signal.

The transmitting-receiving slave power line communication node 23A includes a key cylinder (not shown) which is mechanically rotated with a mechanical key (not shown) of the vehicle.

For example, when the key cylinder of the vehicle is mechanically rotated with the mechanical key, the driver-seat side door lock actuator 26A having the transmitting-receiving slave power line communication node 23A is driven and an operation signal is output to the second power line 27 from the transmitting-receiving slave power line communication node 23A.

The rear-seat side door lock actuator 26B is driven by the receiving slave power line communication node 23B which has received the operation signal.

For example, when an instruction signal instructing the unlocking of the vehicle door is wirelessly transmitted from a mobile device in response to an operator's operation in regard to the mobile device (not shown) and the instruction signal is received by the radio communication unit, the instruction signal is transmitted to the master power line communication node 21 via the in-vehicle LAN communication line 31.

The master power line communication node 21 multiplexes a signal instructing the driving of the door lock actuators 26A and 26B, a signal of power, and a token signal in response to the instruction signal and outputs the multiplexed signals to the second power line 27.

The driver-seat side door lock actuator 26A and the rear-seat side door lock actuator 26B are driven by the transmitting-receiving slave power line communication node 23A and by the receiving slave power line communication node 23B which had received the signals.

The driver-seat side window switch 25B can instruct the opening and closing of windows of the other seat sides in addition to the driver-seat side. For example, when the driver-seat side window switch 25B is made to operate by an operator, the power window motor 26E connected to the transmitting slave power line communication node 22B is driven or an operation signal is output to the second power line 27 from the transmitting slave power line communication node 22B, whereby the power window motor 26F connected to the receiving slave power line communication node 23C which has received the operation signal is driven.

When the rear-seat side window switch 26C is made to operate by an operator, the power window motor 26F connected to the receiving slave power line communication node 23C is driven.

As described above, in the in-vehicle power line communication system 10 according to this embodiment, since communication can be performed in the power line communication network 11 through the use of only the first power line 13 and the second power line 27, no special communication line is necessary, the cost of system construction can be reduced, and a decrease in weight of the system can be achieved.

Only the master power line communication node 21, the plural transmitting slave power line communication nodes 22, and the plural receiving slave power line communication nodes 23 are connected to the second power line 27 and other devices controlled by control signals output from control units other than the master power line communication node 21 are not connected to the second power line 27.

Accordingly, it is possible to easily prevent, for example, noise generated from electronic elements of the other devices from being superimposed on a signal to be transmitted via the second power line 27. No special modulation method for improving noise resistance or the like is necessary, and it is possible to reduce the cost of system construction and to prevent an increase in processing load.

Furthermore, for example, it is possible to prevent a signal transmitted via the second power line 27 from being absorbed or attenuated by another device.

Since the master power line communication node 21, the plural transmitting slave power line communication nodes 22, and the receiving slave power line communication nodes 23 communicate with each other in accordance with the time-triggered communication protocol, the same signal is periodically transmitted via the second power line 27. Accordingly, for example, even when the receiving slave power line communication nodes 23 hardly receives a proper signal at an appropriate timing due to noise or the like, the proper signal can be received at a subsequent time, thereby guaranteeing the desired stability of communication via the second power line 27.

Even when the reception of a signal is delayed in this way, the communication via the second power line 27 is performed by the operator's operation in regard to the transmitting-side in-vehicle devices 25 and is thus limited to communication for device operations (for example, unlocking of a vehicle door or opening or closing of a vehicle window and the like) permitting an appropriate time delay of an extent that does not impose an unpleasant feeling on the operator or is not sensed by the operator.

That is, device operations (for example, operation control of an engine and the like) hardly permitting the delay of signal reception do not depend on the operator's operation but are automatically controlled without any time delay. The communication for such device operations is not set as the communication via the second power line 27.

Accordingly, it is possible to reduce the cost of system construction without damaging marketability.

Since the choke coil 14 is installed on the upstream side of the power line communication network 11, that is, between the power line communication network 11 and the battery 12, it is possible to prevent noise generated from the battery 12 from being superimposed on a signal transmitted via the second power line 27 and to prevent a signal transmitted via the second power line 27 from being absorbed or attenuated by the battery 12.

In the above-mentioned embodiment, the choke coil 14 is not essential.

What is claimed is:

1. An in-vehicle power line communication system in which a power line communication network and a battery mounted on a vehicle are connected to each other via a first power line,
wherein the power line communication network comprises:
a master power line communication node that is connected to the battery via the first power line and that is supplied with power from the battery;
a second power line;
a plurality of slave power line communication nodes having at least a transmitting slave power line communication node and a receiving slave power line communication node that are connected to the master power line communication node via the second power line, that are supplied with the power from the battery via the master power line communication node, and that are connected to each other via the second power line so as to be able to perform multiplex communication with each other;
a transmitting-side in-vehicle device that is connected to the transmitting slave power line communication node, that can operate in response to an operator's operation, and that outputs an operation signal, which indicates the operator's operation was made, to the second power line from the transmitting slave power line communication node by the multiplex communication; and
a receiving-side in-vehicle device that is connected to the receiving slave power line communication node and that can operate when receiving the operation signal output from the transmitting slave power line communication node,
wherein the master power line communication node and the plurality of slave power line communication nodes communicate with each other in accordance with a time-triggered communication protocol which performs periodic data communication,
wherein mutual transmitting and receiving operations of the plurality of slave power line communication nodes are controlled by a token signal output from the master power line communication node, wherein only the master power line communication node and the plurality of slave power line communication nodes are connected to the second power line,
wherein the token signal instructs a schedule for periodic data transmission and reception between a specific transmitting slave power line communication node among a plurality of transmitting slave power line communication nodes and a specific receiving slave power line communication node, which corresponds to the specific transmitting slave power line communication node, among a plurality of receiving slave power line communication nodes, wherein the token signal instructs performance of periodic data transmission at different predetermined times depending on the transmitting slave power line communication node, and the token signal instructs performance of periodic data reception at different predetermined times depending on the receiving slave power line communication node, wherein each of the transmitting slave power line communication nodes periodically performs data transmission at predetermined unique timings instructed by the token signal, wherein each of the receiving slave power line communication nodes periodically performs data reception at predetermined unique timings instructed by the token signal, and wherein data transmitted from the specific transmitting slave power line communication node is only received by the specific receiving slave power line communication node.

2. The in-vehicle power line communication system according to claim 1, further comprising a choke coil installed in the first power line.

3. The in-vehicle power line communications system according to claim 1, wherein the communication between the master power line communication node and the plurality of slave power line communication nodes is performed so that the same communication is repeatedly performed at a predetermined timing via the second power line.

4. The in-vehicle power line communication system according to claim 1, wherein the transmitting-side in-vehicle device includes at least a switch operating in response to the operator's operation wherein the receiving-side in-vehicle device includes at least an actuator of which the driving is controlled in accordance with the operation signal, wherein the master power line communication node multiplexes a signal of power supplied from the battery via the first power line and the token signal, and outputs the multiplexed signals to the second power line, wherein only a signal of power output from the master power line communication node out of the multiplexed signals received by the receiving slave power line communication node is supplied to the receiving-side in-vehicle device at a predetermined time corresponding to the operation signal received by the receiving slave power line communication node, and wherein the communication via the second power line is performed by the operator's operation and is limited to communication for device operations permitting a time delay.

5. The in-vehicle power line communication system according to claim 4, wherein the master power line communication node multiplexes a signal of power supplied from the battery via the first power line and the token signal, and outputs the multiplexed signals to the second power line, and wherein only a signal of power output from the master power line communication node out of the multiplexed signals received by the receiving slave power line communication node is supplied to the receiving-side in-vehicle device at a predetermined time corresponding to the operation signal received by the receiving slave power line communication node.

* * * * *